Sept. 22, 1964 A. M. BISHAY 3,150,281
GLASS OF HIGH ULTRAVIOLET TRANSMITTANCE, METHOD, AND
ARTICLES MANUFACTURED THEREFROM
Filed April 26, 1961
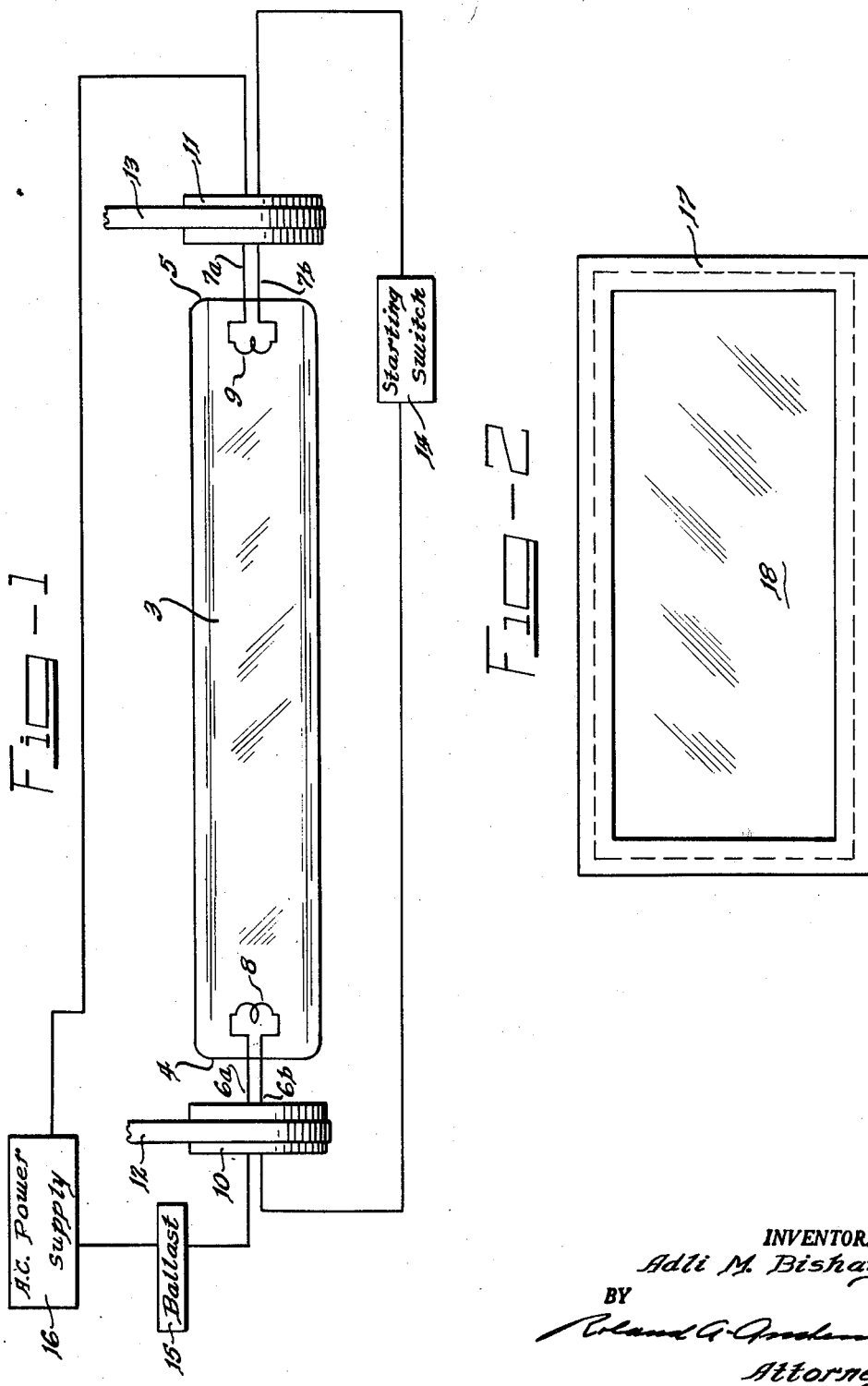
INVENTOR.
Adli M. Bishay
BY
Roland G. Anderson
Attorney _United States Patent Office_  3,150,281
Patented Sept. 22, 1964

3,150,281
GLASS OF HIGH ULTRAVIOLET TRANSMITTANCE, METHOD, AND ARTICLES MANUFACTURED THEREFROM
Adli M. Bishay, Chicago, Ill., assignor to the United States of America as represented by the United States Atomic Energy Commission
Filed Apr. 26, 1961, Ser. No. 105,825
4 Claims. (Cl. 313—221)

The invention relates to a novel glass composition with high transmittance of ultraviolet light, to a method of making the same, and to novel articles of manufacture in which the glass is employed.

The inability of nearly all known glass compositions with the exception of fused silica to transmit ultraviolet light in satisfactory amounts adds greatly to the cost of manufacture of devices employing such radiation, such as germicidal lamps, missile domes, and the like. It also makes it impractical for schools, offices, industrial plants, and the like to have windows with high ultraviolet transmittance, although these would be used if they could be made cheaply enough.

Substantially pure fused silica transmits ultraviolet light satisfactorily, but it is hard to work with due to its high melting point, which results in its high cost. When additions are made to pure silica to lower its melting point its ultraviolet transmittance quickly lessens; even so small an addition as four weight percent of $B_2O_3$ totally destroys transmittance of ultraviolet of 200 millimicron wavelength, although it does permit a substantial portion of longer ultraviolet wavelengths to pass through. Since, however, the shorter wavelengths are more effective germicidally than the longer ones, this composition, which is known as Vycor, is not as efficient as might be desired for such uses as germicidal lamps.

Recently a glass has been developed with an equal molar ratio of sodium phosphate and magnesium phosphate which transmits substantial amounts of ultraviolet over quite a wide spectrum, but with a considerable loss in efficiency as compared to fused silica, ranging from about 12 to over 27 percent of loss for the 200 to 253.5 millimicron spectrum.

It is accordingly an object of the invention to provide a glass composition having a lower melting point than pure silica, and able to transmit ultraviolet light with an efficiency more nearly comparable to that of pure fused silica than is now known.

It is a further object to provide a method for producing a glass composition of the kind just described.

It is a further object to provide a germicidal lamp which can be produced more economically than such lamps employing envelopes of pure fused silica, and with an efficiency of operation closely approaching the efficiency of pure fused silica lamps.

It is a further object of the invention to provide a window capable of transmitting ultraviolet light with an efficiency closely approaching that of fused silica, but less expensive than fused silica.

All the foregoing objects are attained by my discovery that boric oxide glasses containing an additive of equal molar parts of alumina and potassium oxide, when made under reducing conditions, have high transmittance for ultraviolet light throughout a wide spectrum, with efficiencies of from about 86 to 98 percent as compared with pure fused silica. These compositions have much lower melting points than fused silica; for example, a preferred composition which will be described later, has a melting point of about 1250° C., which is about 460° C. below that of pure fused silica, so that articles such as germicidal lamps may be made from it far more economically than from pure silica, yet at only a comparatively slight sacrifice of operating efficiency.

In the drawings:

FIGURE 1 shows a semi-exploded view of a germicidal lamp made according to the invention. An elongated glass envelope 3 having the composition of the invention is hermetically sealed at both ends 4 and 5 around conductors 6a, 6b, 7a, and 7b connected to filaments 8 and 9, respectively, therein. End caps 10 and 11, shown removed from ends 4 and 5, are normally forced over ends 4 and 5 and the entire assembly is suspended by hangers 12 and 13, which engage the end caps 10 and 11. Conductors 6b and 7b connect filaments 8 and 9 to a starter switch 14. Conductor 6a connects filament 8 through a ballast 15 to one side of an A.C. power supply 16. The conductor 7a connects filament 9 to the other side of the A.C. power supply 16. When the above-described electrical circuit is energized, an ultraviolet-producing substance such as mercury vapor disposed throughout the interior of envelope 3 becomes excited and emits a glowing radiation passing through the envelope 3. This radiation contains a substantial amount of ultraviolet light.

FIGURE 2 shows a window having a frame 17 of wood, metal, or the like, and a pane 18 made of the glass composition of the invention.

My glass composition consists, as above stated, of boric oxide modified by a minor amount of an additive consisting of equal molar proportions of alumina and potassium oxide. My preferred composition is one with the following molar proportions:

$$4.5B_2O_3,\ 1.0Al_2O_3,\ \text{and}\ 1.0K_2O$$

This composition can be arrived at, as is known in the art, in several ways, my preferred method being to sinter at about 500° C. for about two hours a well mixed powdered mixture of ammonium pentaborate tetrahydrate $(NH_4)_2B_{10}O_{16}\cdot 8H_2O$, hydrated alumina $Al(OH)_3$, and potassium carbonate ($K_2CO_3$). This results in the formation of a single mass and minimizes the loss of components which would take place if the mixture were to be melted directly from the powdered state.

After the sintering the mass should be melted at about 1250° C. for about three hours in an inert atmosphere. During this time the potassium carbonate will lose carbon dioxide to become $K_2O$, the $Al(OH)_3$ will dehydrate to $Al_2O_3$, and the ammonium pentaborate will decompose to boric oxide, losing hydrogen and ammonia, both of which will have a reducing action on the melt so long as the ambient atmosphere is inert. Of course other compounds which decompose to give boric oxide and a reducing agent could be used, but ammonium pentaborate tetrahydrate is the most efficient and is therefore preferred. Likewise dry alumina, $Al_2O_3$, rather than $Al(OH)_3$ could be used. Whatever the compounds in the original powdered mixture, they should be introduced in the stoichiometric amounts required to give, upon heat decomposition, the molar proportions above mentioned of $B_2O_3$, $Al_2O_3$, and $K_2O$.

Following the melting the glass should be formed into the shapes desired and annealed, as is known in the art.

Glass made according to the invention was made into discs 1 mm. thick, polished, and its transmittance read in a Cary spectrophotometer. Discs of identical thickness and polish of other glasses were read in the same spectrophotometer and the readings were compiled in Table I. The glass of the invention, designated in Table I as Argonne #412, had the preferred molar composition of $4.5B_2O_3$, $1.0Al_2O_3$, and $1.0K_2O$, and was sintered and melted in an inert atmosphere. The glass designated as Argonne #111 had the same composition, but was sintered and melted in air. The glass designated as "Phosphate glass (Glaze, N.B.S.)" was the equal molar mixture of sodium and magnesium phosphates already mentioned. Corex A is mainly calcium phosphate, and Corex D is calcium phosphate slightly modified. The figures opposite the glass designations denote the percent of transmittance of the wavelengths shown at the top of the two columns.

*Table I*

|  | 253.5 m$\mu$ | 200 m$\mu$ |
|---|---|---|
| Fused silica | 91.2 | 89.2 |
| Argonne #412 (reducing conditions) | 89.3 | 76.9 |
| Vycor | 87.6 |  |
| Phosphate glass (Glaze, N.B.S.) | 79.5 | 65.0 |
| Corex A | 71.6 |  |
| Argonne #111 (oxidizing conditions) | 62.0 | 50.0 |
| Corex D | 3.6 |  |

*Example*

63.4 grams of $(NH_4)_2B_{10}O_{16} \cdot 8H_2O$, 18.7 grams of $Al(OH)_3$, and 17.9 grams of $K_2CO_3$ were blended together in the dry state and then sintered together at 500° C. for two hours in a platinum crucible in a sintering furnace. The resulting sintered mass was then transferred in the same crucible to a controlled atmosphere furnace and heated to 1250° for three hours under argon. The resulting glass was poured to a depth of 1 mm. into molds 2 cm. in diameter and annealed at 400° C. The resulting discs were then ground and polished. This procedure resulted in the sample designated Argonne #412 in Table I.

It will be understood that this invention is not to be limited to the details given herein, but that it may be modified within the scope of the appended claims.

What is claimed is:

1. A glass composition consisting essentially of the molar proportions $4.5B_2O_3$, $1.0Al_2O_3$, and $1.0K_2O$.

2. A method of making a glass of high ultraviolet transmittance, comprising melting under an inert atmosphere a mixture consisting essentially of the molar proportions $0.90(NH_4)_2B_{10}O_{16} \cdot 8H_2O$, $2.0Al(OH)_3$ and $1.0K_2CO_3$.

3. A germicidal lamp comprising an elongated cylindrical envelope of glass consisting essentially of $B_2O_3$, $Al_2O_3$ and $K_2O$ in the molar proportions of $4.5B_2O_3$, $1.0Al_2O_3$ and $1.0K_2O$, said envelope being hermetically sealed at both ends around electrical conductors, a ballast at one of the ends, electrodes within the envelope at each end, and mercury vapor throughout the interior of the envelope.

4. An architectural window comprising a frame and at least one pane of glass having the molar proportions of $4.5B_2O_3$, $1.0Al_2O_3$ and $1.0K_2O$.

References Cited in the file of this patent

UNITED STATES PATENTS

| 947,246 | Levison | Jan. 25, 1910 |
| 2,238,777 | Lemmers et al. | Apr. 15, 1941 |
| 2,899,584 | Verwey | Apr. 11, 1959 |